Nov. 8, 1932.    L. A. BIXBY    1,886,865
MULTIPLE DISK CLUTCH
Filed May 17, 1930    2 Sheets-Sheet 2
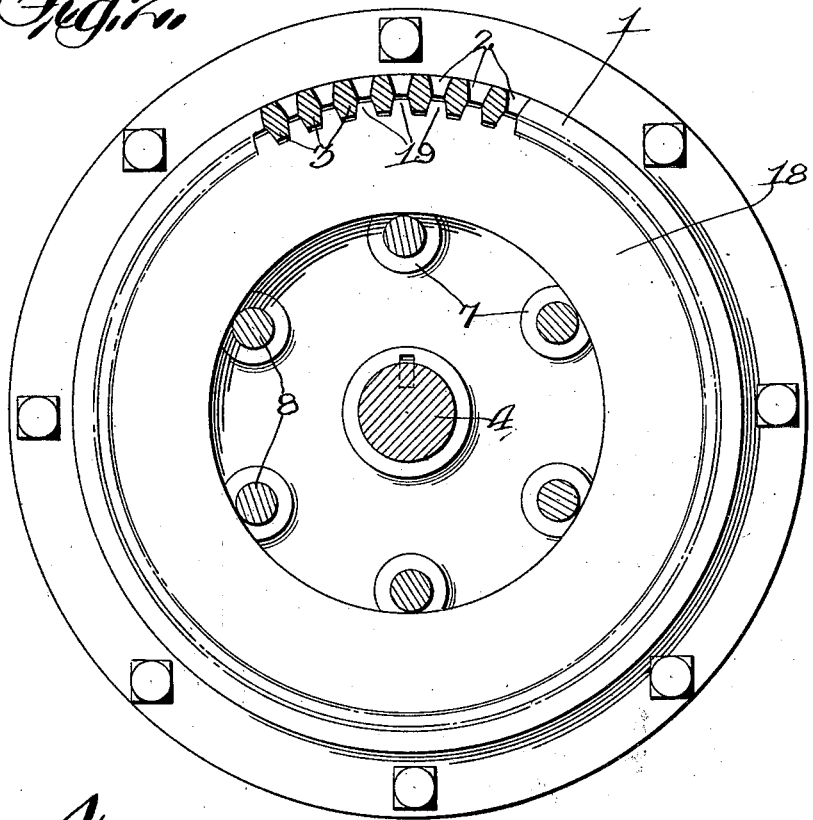
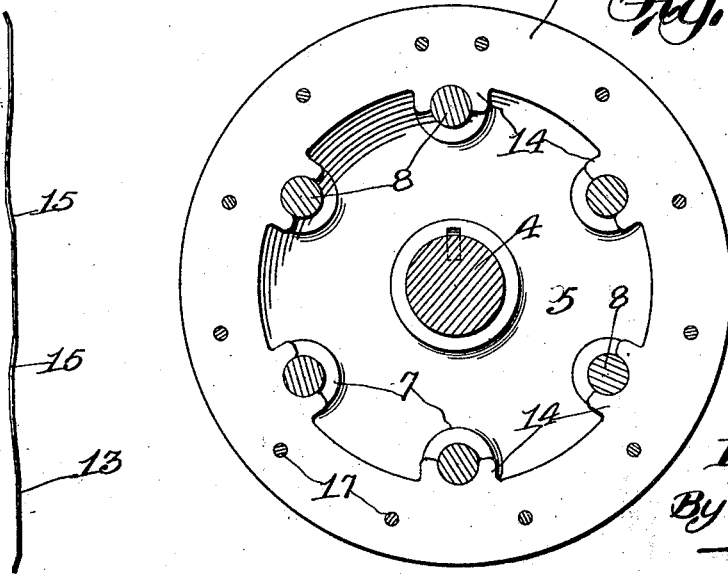
Inventor
Leo A. Bixby
By
Attorneys Patented Nov. 8, 1932

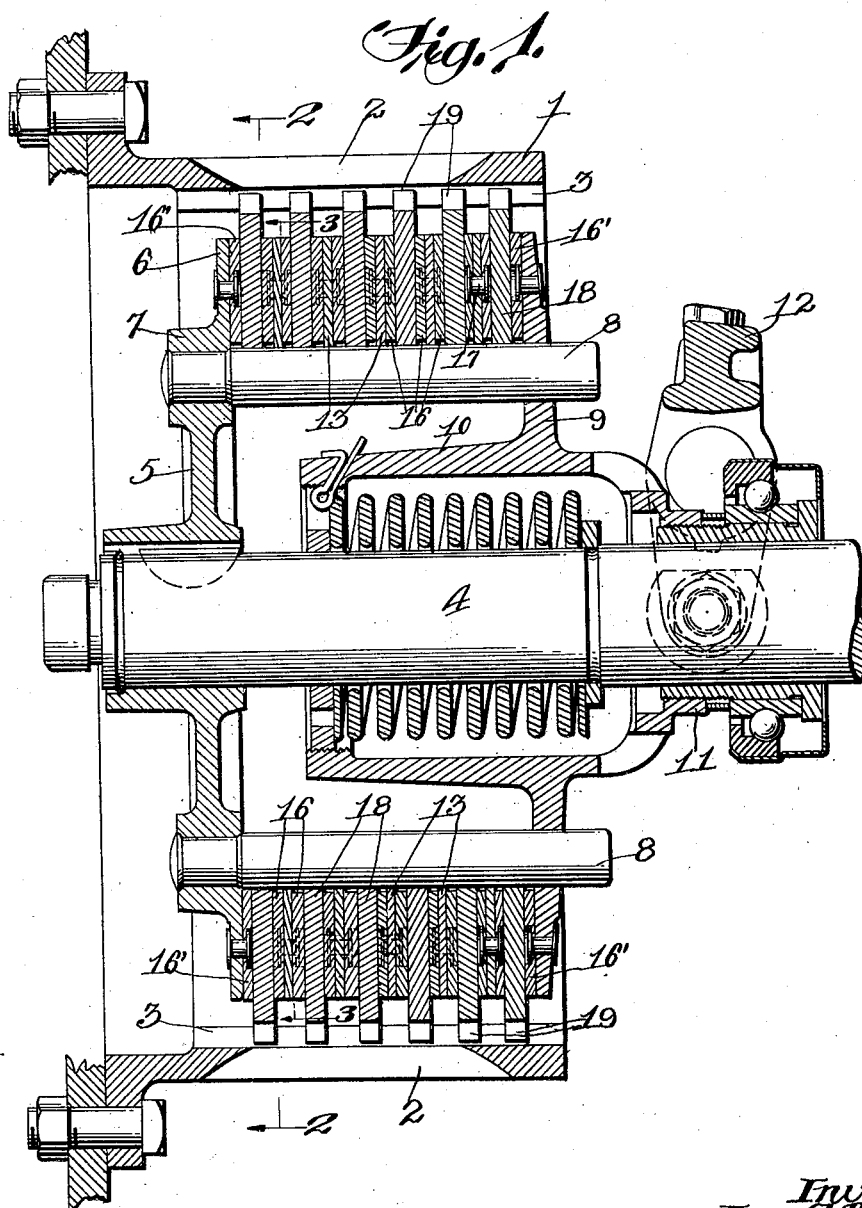

1,886,865

UNITED STATES PATENT OFFICE

LEO A. BIXBY, OF MILWAUKEE, WISCONSIN, ASSIGNOR TO UNIT CORPORATION OF AMERICA, OF MILWAUKEE, WISCONSIN

MULTIPLE DISK CLUTCH

Application filed May 17, 1930. Serial No. 453,239.

This invention relates to improvements in clutches and more particularly to what is known as a multiple disk clutch.

One of the objects of my invention is the provision of an improved type of multiple disk clutch wherein the housing for the disks is provided with a plurality of openings, closely adjacent the disk members so that the heat absorbed by the disk members can be readily dissipated through the openings in the clutch housing to prevent the clutch disks from becoming overheated and distorted.

Another object of my invention is the provision of a multiple disk type of clutch, wherein the driving clutch disks are removably mounted within a flywheel or housing and have arranged between these driving disks a series of driven disks removably supported by a member movable axially with respect to the housing and provided with clutch faces adapted to cooperate with the removable disks of the housing, together with means for compressing or forcing the several disks together to provide a frictional connection between the disks carried by the housing and the axially movable member.

Another object of my invention is the provision of a multiple disk type of clutch wherein the driving clutch disks have a predetermined mass sufficient to absorb the heat from the friction between the driving and the driven disks and dissipate the same out through suitable openings in the perimeter of the driving drum without the distortion of the disk members.

A further object of the invention is the provision of a multiple disk clutch, wherein a housing is provided having a plurality of transverse slots or openings in the outer wall thereof and provided with transversely disposed spaced ribs with clutch disks having teeth adapted to engage with said ribs whereby the outer perimeter or tooth portion of the main disks are arranged closely adjacent the openings. Thus the heat produced by the frictional contact of the disk faces will be absorbed by the disks carried by the housing and dissipated out through the openings in the exterior wall of the housing.

A still further object of my invention is the provision of a clutch of the multiple disk type wherein the clutch disks are removably mounted with respect to the members to be connected by the clutch disks so that any worn clutch disks can be quickly and easily replaced.

Figure 1 is a transverse sectional view taken through a clutch constructed in accordance with my invention;

Figure 2 is a view at right angles to Figure 1 and taken on the line 2—2 of Figure 1;

Figure 3 is a transverse sectional view on the line 3—3 of Figure 1; and,

Figure 4 is an edge view of one of the smaller clutch disks.

Referring now more particularly to the drawings, it will be noted that I have illustrated my improved multiple disk clutch as used in connection with a rotatable pulley or flywheel 1. This flywheel is provided in its outer perimeter with a plurality of transverse openings 2, and extending inwardly upon the interior of the flywheel are the tapered transverse ribs 3, the ribs 3 being arranged between the slots or openings 2 as is more clearly apparent from the showing in Figure 2.

This flywheel or housing 1 is normally under rotation, while the shaft 4 arranged axially of the flywheel or housing 1 may be normally stationary. The shaft has keyed thereto a hub 5 having an outer annular flange 6 with smaller hub portions 7 arranged annularly of the shaft 4. The smaller hub portions 7 have fitted therein a plurality of rods 8, the inner ends of which are fixed against axial movement relative to the hub members 7, while the other ends thereof are loosely received within openings in the annular flange 9 on the inner housing 10. This inner housing is connected to a shiftable member 11 of any well known type and actuated by lever 12.

The construction illustrated within the housing 10 and in connection with the shiftable member forms no part of my invention and, therefore, is not essential as far as the construction and operation of the same is concerned.

In forming the multiple disk clutch, it will be noted that I provide a plurality of clutch disks 13 which are comparatively thin disks and are provided with saddle member 14 arranged at intervals circumferentially upon the inner circumference of the disk which engage over the rods 8, as illustrated in Figure 3, thus retaining these comparatively thin disk members in position with respect to the rods 8 and preventing their rotation independent of the hub member 5. As illustrated in Figure 4, these comparatively thin disks are provided with a plurality of laterally bent sections 15, arranged in circumferential spaced relation to provide an uneven surface upon opposed faces of the disks, thus providing a better gripping surface for the clutch disks.

Arranged upon opposite sides of each disk 13 are the composite facings 16 which are riveted to the disk members 13 by means of the rivets 17. The inner face of the flange 6 and the inner face of the flange 9 have also riveted thereto, composite disks 16'.

Arranged between each set of the combination disks 13 and composite disks 16 are the comparatively large disks 18, the outer perimeters of which are provided with a plurality of teeth 19 adapted to engage with the ribs 3 upon the interior of the housing or flywheel 1.

The disks 18 are alternately arranged between the sets of disks 13 and composite disks 16, as shown in Figure 1, with the composite disk 16' arranged upon the outer face of each outermost disk 18, thus when the flanges 6 and 9 are pressed together, the composite disks 16 which are carried by disks 13 are brought into frictional contact with disks 18 so as to complete an operative connection between the flywheel or housing 1 and the shaft 4. At this point I also wish to call attention to the fact that each tooth on the outer perimeter of each disk 18 is positioned directly opposite one of the slots 2 in flywheel 1.

In the usual operation of multiple disk clutches, it is a well known fact that in a great many instances, the disks become overheated and have a tendency to become distorted, due to the fact that no provision is made for the dissipation of the heat, but with my improved construction, it will be readily apparent that due to the relative thickness of the disks 18 and the disks 13, the heat generated in the clutch will be absorbed by disks 18 and the heat dissipated out through the teeth 19 and through the slots or openings 2 in the flywheel or housing.

As stated in the objects of my invention, the driving disks 18 which are removably mounted within the housing formed by the pulley or flywheel 1, are relatively thick disks and of such thickness as to have sufficient mass to absorb the heat due to the friction created between the two sets of disks and dissipate this heat out through the openings 2 in the housing. Attention is directed to the fact that the driven disks 13 are comparatively thin so that they will absorb very little of the heat created by the friction, but this heat will be absorbed by the larger and thicker disks 18.

Another feature which I wish to call attention to is the fact that the disks 13 are provided with a plurality of laterally bent or distorted portions so that when the clutch members are forced into frictional contact with each other, the frictional connection will be made much quicker than if a smooth faced disk were used, and due to these laterally bent portions, it will have a tendency to create heat between the clutch disks which can be quickly dissipated through the clutch disks 18.

It is believed that by constructing a multiple disk clutch and in the manner described above, the usual trouble with distorted clutch disks can be readily overcome and it will also be noted that through the novel manner of mounting the different clutch disks so that they can be quickly removed, any worn clutch disks can be quickly and easily replaced.

While I have shown and described the preferred embodiment of my invention, it will be apparent that slight changes may be made in the construction when putting the invention into practice without departing from the spirit of the same or the scope of the appended claim.

I claim:

A heat dissipating clutch comprising a housing having an annular outer wall provided with an annular row of closely arranged slots extending substantially the full width of the outer wall, said slots having the opposite side walls thereof oppositely inclined defining flared heat outlets leading toward the outer face of the annular wall of the housing, inwardly directed tapered ribs formed on the inner face of the annular wall between the slots, relatively thin driven disks arranged within the housing, relatively thick driving disks removably mounted within the housing and positioned between the relatively thin driven disks and adapted to cooperate therewith, the relatively thick disks extending beyond the relatively thin disks and having a plurality of peripheral teeth received between the ribs of the outer annular wall and extending toward the slots, said thick disks having a predetermined mass sufficient to absorb the heat of friction between the driving and driven disks and to carry and dissipate the heat through the slots in the outer wall of the housing, the relatively thin disks having lateral bent portions in circumferential spaced relation, as for the purpose specified.

In testimony that I claim the foregoing I have hereunto set my hand at Milwaukee, in the county of Milwaukee and State of Wisconsin.

LEO A. BIXBY.